(12) United States Patent
Narayanan et al.

(10) Patent No.: US 7,720,476 B2
(45) Date of Patent: *May 18, 2010

(54) METHOD FOR IMPROVING THE RELIABILITY OF LOW LATENCY HANDOFFS

(75) Inventors: Vidya Narayanan, Schaumburg, IL (US); George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1181 days.

This patent is subject to a terminal disclaimer.

(21) Appl. No.: 11/315,404

(22) Filed: Dec. 22, 2005

(65) Prior Publication Data

US 2006/0155878 A1 Jul. 13, 2006

Related U.S. Application Data

(63) Continuation-in-part of application No. 10/438,402, filed on May 15, 2003, now Pat. No. 7,035,640.

(51) Int. Cl.
*H04W 4/00* (2009.01)
*H04W 36/00* (2009.01)
(52) U.S. Cl. .............. 455/435.1; 455/436; 709/245; 709/250

(58) Field of Classification Search ............ 455/435.1, 455/436; 709/245, 250
See application file for complete search history.

(56) References Cited

U.S. PATENT DOCUMENTS

| 7,035,640 | B2* | 4/2006 | Narayanan et al. | 455/436 |
| 7,313,631 | B1* | 12/2007 | Sesmun et al. | 709/245 |
| 2003/0104814 | A1 | 6/2003 | Gwon et al. | |
| 2003/0125027 | A1 | 7/2003 | Gwon et al. | |
| 2004/0003280 | A1 | 1/2004 | Narayanan et al. | |
| 2004/0137902 | A1 | 7/2004 | Chaskar et al. | |
| 2004/0166857 | A1 | 8/2004 | Shim et al. | |
| 2004/0229612 | A1* | 11/2004 | Narayanan et al. | 455/435.1 |
| 2006/0155878 | A1* | 7/2006 | Narayanan et al. | 709/250 |

* cited by examiner

*Primary Examiner*—William D Cumming
(74) *Attorney, Agent, or Firm*—Indira Saladi; Anthony P. Curtis

(57) ABSTRACT

A method for is disclosed in which a first message is received from a first device. Upon receipt of the first message, a registration request is transmitted via the first device to a home agent for pre-registration of a co-located care-of address associated with a second device. The registration request includes the co-located care-of address associated with the second device. If the first message is received again from the first device prior to attaching to the second device, the registration request is re-transmitted via the first device.

17 Claims, 8 Drawing Sheets

METHOD FOR IMPROVING THE RELIABILITY OF LOW LATENCY HANDOFFS

CROSS-REFERENCE TO RELATED APPLICATION

This application is a continuation-in-part of U.S. patent application Ser. No. 10/438,402, filed May 15, 2003 now U.S. Pat. No. 7,035,640, of the same title.

FIELD OF THE INVENTION

The present invention relates generally to a method for improving the reliability of low latency handoffs.

BACKGROUND OF THE INVENTION

Today, developers are focused more on providing all Internet Protocol ("IP") solutions to roaming nodes (e.g., radios, telephones, laptops, personal digital assistants, etc.). As such, it is necessary to have a seamless IP-based mobility solution. Seamless mobility for mobile nodes from one location to another is hence becoming increasingly important. Thus, fast and reliable handoffs for the mobile node are becoming more important.

One of the ways to achieve low latency handoffs is to make use of layer 2 triggers to perform layer 3 handoffs. A pre-registration technique has been proposed in an Internet Draft to address low latency handoffs. The pre-registration technique exploits early triggers from the link layer that indicate a handoff is going to occur. The pre-registration technique uses this early trigger to start the mobile IP registration process from the mobile node's first foreign agent and/or first access node (i.e., current point of attachment), even though the registration itself is in reference to a new point of attachment, e.g. a second foreign agent and/or second access node. This early launch of the mobile IP registration process helps reduce overall handoff delay since more time is provided for the mobile IP registration to complete.

As illustrated in FIG. 1, the first foreign agent 100 acts as a proxy for the second foreign agent 102 so that the mobile node 104 and the first foreign agent 100 can exchange messages on behalf of the second foreign agent 102. It is important to note that where foreign agents are used that the first foreign agent does not generate the messages and simply relays the messages to and from the mobile node 104.

Summarily, where access nodes are used, if a mobile node tries to perform pre-registration for a new co-located care-of-address on a new link, e.g. with a second access node, the mobile node must wait for a timeout before it attempts to register again with a home agent. In such a case, the message sent on the old link may have been lost and so handoff is delayed.

A disadvantage of the pre-registration technique as described in the Internet draft (and as known with access nodes) is that it relies on control signaling between the mobile node 104 and the first foreign agent 100 after the link layer has indicated that a handoff is imminent. In other words, the quality of the air interface link between the mobile node 104 and the first point of attachment, e.g. a first foreign agent 100 is likely deteriorating rapidly. The deterioration of the link between the mobile node 104 and the first point of attachment increases the likelihood of dropped messages. Under these conditions, it may not always be possible for the mobile node 104 to complete the pre-registration process prior to the "link down" with the first point of attachment (e.g., the mobile node 104 may be moving too fast). Under the Internet Draft, when pre-registration fails, the handoff time is longer than with standard mobile IP. This shortcoming makes the pre-registration technique as described in the Internet draft less than desirable, especially for mission critical applications.

Further, in the case of a pre-registration failure, one of the following needs to occur before the mobile node 104 can perform a mobile IP registration: either the registration request timer expires and the mobile node 104 solicits another agent advertisement from the second point of attachment, e.g. second foreign agent 102, or the second point of attachment transmits its regular periodic router and/or agent advertisement. A disadvantage to this technique is that both of these events could take in the order of a second to occur, which would significantly slow the handoff process.

Alternatively, the mobile node 104 could always transmit an agent solicitation upon "link up" with the second point of attachment, and transmit a registration request to the home agent 106 upon receiving the advertisement. If the home agent 106 already has the care of address registered, the home agent 106 would simply refresh the state and send a reply. A disadvantage to this technique is that the number of registration requests could potentially double, which may lead to home agent 106 loading issues. Another disadvantage to this technique is wasted resources in case where the pre-registration succeeds.

Thus, there exists a need for a new method for improving the reliability of low latency handoffs.

SUMMARY

Various methods for improving the reliability of a low latency handoff are disclosed. In one embodiment, a first message is received from a first device. Upon receipt of the first message, a registration request is transmitted via the first device to a home agent for pre-registration of a co-located care-of address associated with a second device. The registration request includes the co-located care-of address associated with the second device. If the first message is received again from the first device prior to attaching to the second device, the registration request is re-transmitted via the first device.

In another embodiment, a registration request is transmitted to a first device. The registration request is for pre-registration of a co-located care-of address associated with a second device and requires confirmed delivery. If the registration request for pre-registration was not received by the first device within a predetermined time period after the step of transmitting, the registration request is re-transmitted via the second device after attaching to the second device.

In another embodiment, a proxy router advertisement is received from a first access node. Upon receipt of the proxy router advertisement, a registration request is transmitted via the first access node to a home agent for pre-registration of a co-located care-of address with a second access node. The registration request includes the co-located care-of address associated with the second access node. If the proxy router advertisement is received again from the first access node prior to attaching to the second access node, the registration request is re-transmitted via the first access node.

Certain portions of this application, such as the Abstract and Summary, are provided to allow the reader to quickly ascertain the nature of the disclosure. They are submitted with the understanding that they will not be used to interpret or limit the scope or meaning of the claims.

BRIEF DESCRIPTION OF THE FIGURES

An embodiment of the invention is now described, by way of example only, with reference to the accompanying figures in which.

DETAILED DESCRIPTION

Figure 1:
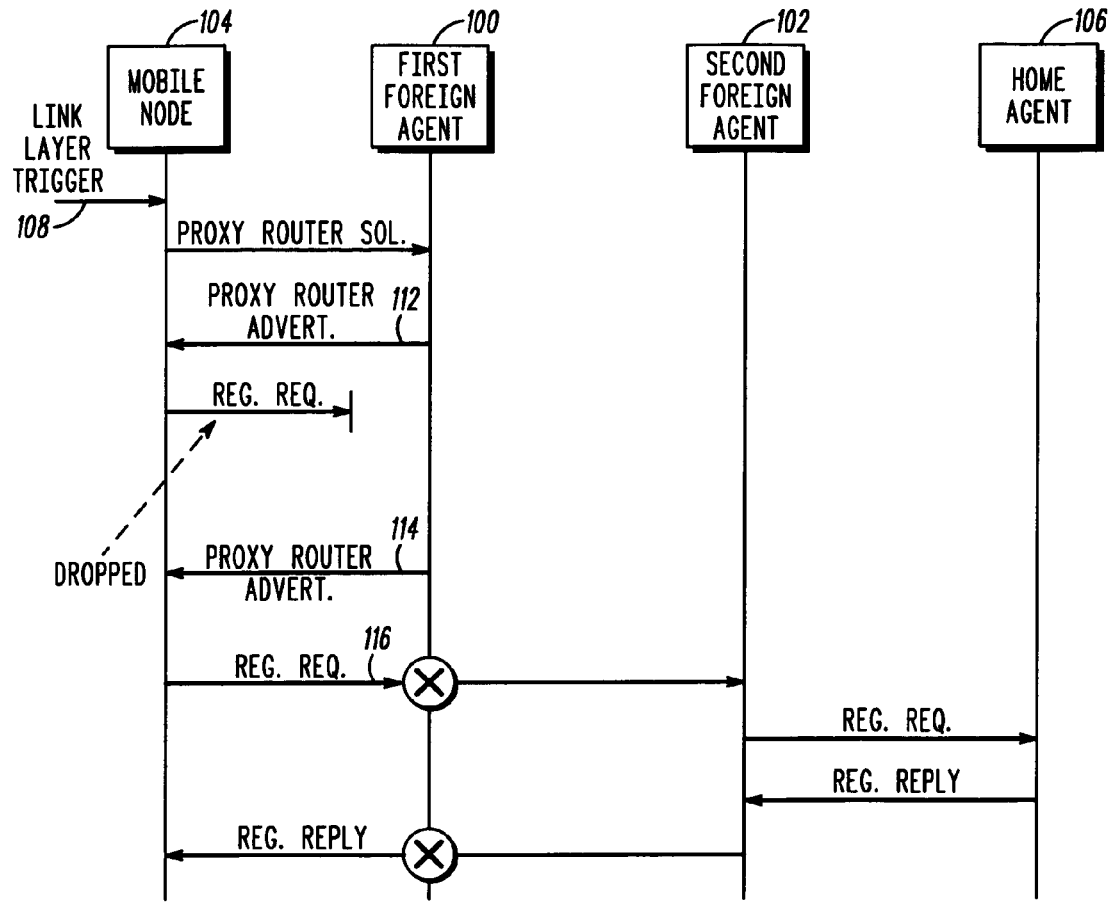
FIG. 1 illustrates a bounce diagram of the signaling between a mobile node, a first foreign agent, a second foreign agent, and a home agent.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

An embodiment of the present invention modifies the signaling algorithms in the mobile node 104, the current point of attachment 100, and the new point of attachment 102 from the Internet Draft to address the shortcomings of the pre-registration technique as described above. It should be noted that in accordance with an embodiment of the present invention, the signaling changes in the current point of attachment 100 are required prior to "link down" with the mobile node 104, and the signaling changes in the new point of attachment 102 are required after "link up" with the mobile node 104. It is also important to note that the signaling outlined below with respect to FIGS. 1-4 occurs in parallel. Let us now turn to the details and figures of the present invention.

As in standard mobile IP applications, upon "link up", the mobile node 104 solicits agent advertisements; in other words, the mobile node 104 determines if any mobile IP agents (home agent or foreign agent) are on the same network. If the mobile node 104 is on its home network, the mobile node 104 will receive the agent advertisement from its home agent 106. Upon receiving the agent advertisement from its home agent 106, the mobile node 104 transmits a registration request to its home agent 106. The home agent 106 transmits a registration reply to the mobile node 104 indicating a successful registration with the home agent 106. When on the home network, the mobile node 104 actually de-registers with the home agent 106 if it has previously registered since the home agent 106 does not need to tunnel any packets to the mobile node 104 via foreign agents.

If the mobile node 104, however, is on a network away from home, the mobile node 104 will receive the agent advertisement from a foreign agent 100 on the "visiting" network. Upon receipt of the agent advertisement from the foreign agent 100 on the "visiting" network, the mobile node 104 transmits the registration request to the home agent 106 via the foreign agent 100. Upon receipt of the registration request, the home agent 106 transmits a registration reply to the mobile node 104 indicating a successful registration with the foreign agent 100. At this point, for purposes of the following discussion, let us assume that the mobile node 104 has successfully registered with, and thus is currently attached to, the foreign agent 100.

Let us now assume that the mobile node 104 begins to move away from the first foreign agent (i.e., its current point of attachment) 100 towards a second foreign agent (i.e., its future point of attachment) 102. It is desirable for the mobile node 104 to begin pre-registration with the second foreign agent 102 upon notice of a handoff to reduce latency. As illustrated in FIG. 1, if the mobile node 104 receives a trigger that a handoff is about to occur, the mobile node 104 transmits a proxy router solicitation message to the first foreign agent 100; the proxy router solicitation message solicits the first foreign agent 100 for the address of the second foreign agent 102. In return, the mobile node 104 receives a proxy router advertisement from the first foreign agent 100 comprising the address of the second foreign agent 102. Alternatively, if the first foreign agent 100 receives the trigger 108 that a handoff is about to occur, rather than the mobile node 104, the first foreign agent 100 transmits the proxy router advertisement to the mobile node 104 without requiring the mobile node 104 to transmit the proxy router solicitation message. In one embodiment, the link layer triggers the network layer that the handoff is imminent, however, the trigger can alternatively be implemented at other layers as well.

Figure 2:
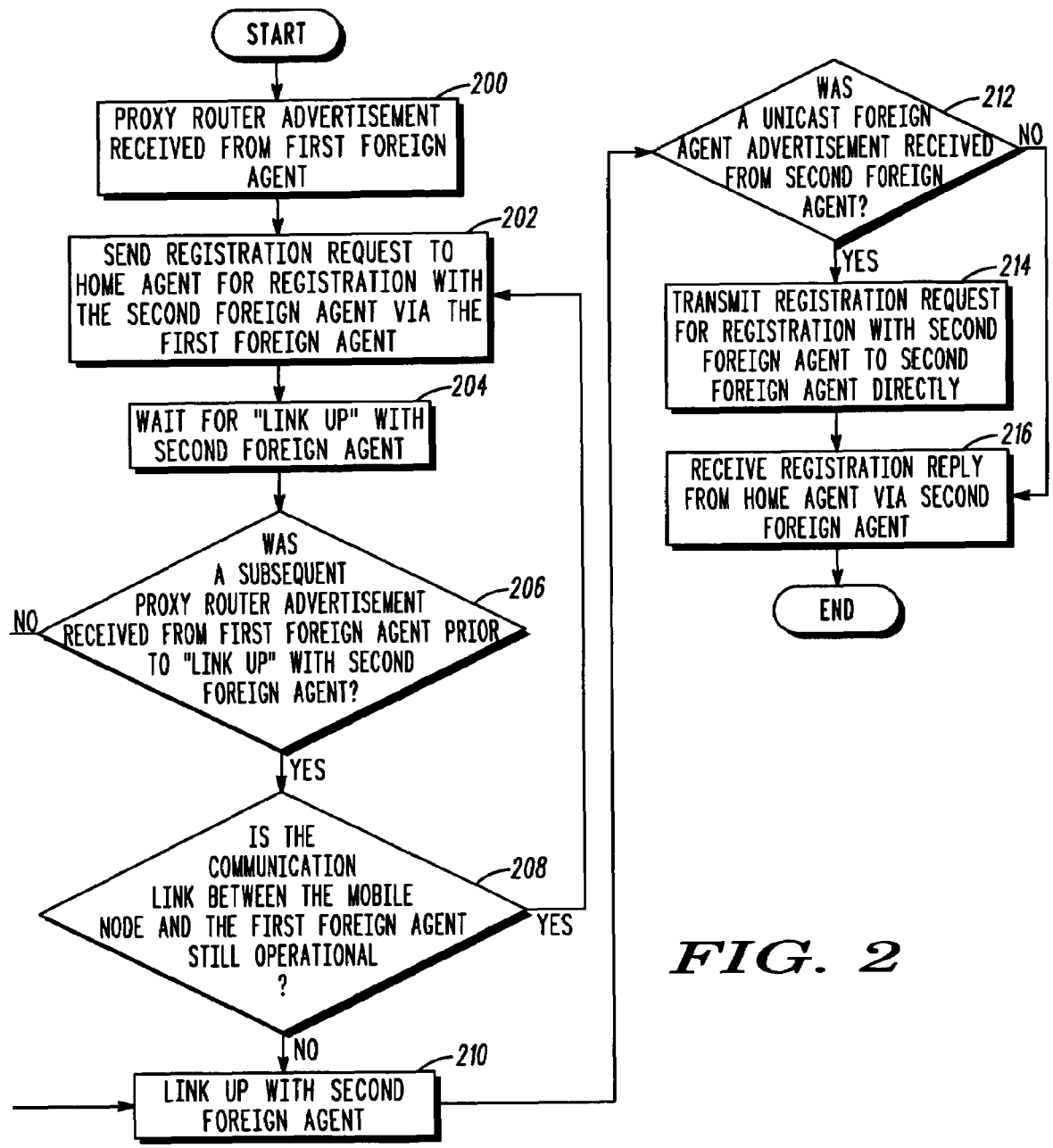
FIG. 2 illustrates a flowchart of the signaling transmitted and/or received by the mobile node in accordance with one embodiment of the present invention.

FIG. 2 illustrates a flowchart of the signaling transmitted and/or received by the mobile node 104 in accordance with one embodiment of the present invention. Upon receipt of the proxy router advertisement from the first foreign agent 100 (at step 200), the mobile node 104 transmits a registration request to the home agent 106 for registration with the second foreign agent 102 via the first foreign agent 100 (at step 202) and waits for "link up" with the second foreign agent 102 (at step 204).

If the mobile node 104 receives a subsequent proxy router advertisement 114 from the first foreign agent 100 prior to "link up" with the second foreign agent 102 (at step 206), it is assumed that the first foreign agent 100 did not receive the registration request from the mobile node 104. As a result, the mobile node 104 determines the status of the communication link between the mobile node 104 and the first foreign agent 100 (at step 208). If the mobile node 104 determines that the communication link with the first foreign agent 100 has deteriorated (i.e., the communication link between the mobile node 104 and the first foreign agent 100 is no longer operational), the mobile node 104 no longer attempts to communicate with the first foreign agent 100, and waits for a "link up" with the second foreign agent 102 (at step 210).

If the mobile node 104, however, determines that the communication link with the first foreign agent 100 is still operational (at step 208), the mobile node 104 retransmits the registration request 116 to the home agent 106 for registration with the second foreign agent 102 via the first foreign agent 100 (at step 202) and continues to wait for "link up" with the second foreign agent 102 (at step 204). It is important to note that, in accordance with the present invention, as long as the communication link between the mobile node 104 and the first foreign agent 100 is operational, the mobile node 104 will retransmit its registration request 116 for registration with the second foreign agent 102 via the first foreign agent 100 upon receipt of a proxy router advertisements 112, 114 from the first foreign agent 100.

Upon "link up" at the second foreign agent 102 (at step 210), the mobile node 104 waits idly until it receives a registration reply from the second foreign agent 102 indicating a successful registration with the second foreign agent 102. If the mobile node 104 receives a unicast foreign agent advertisement message (addressed directly to the mobile node 104) from the second foreign agent 102 while waiting for the registration reply from the home agent via the second foreign agent 102 (at step 212), the mobile node 104 transmits its registration request to the home agent 106 for registration with the second foreign agent 102 via the second foreign agent 102 directly (at step 214), and continues to wait to receive the registration reply. In one embodiment of the present invention, the mobile node 104 should only receive the unicast foreign agent advertisement for registration with the second foreign agent 102 from the second foreign agent 102 if the second foreign agent 102 did not receive the registration request from the mobile node 104 (i.e., the first foreign agent 100 did not successfully receive and/or forward the previous registration request for registration with the second foreign agent 102 from the mobile node 104).

Upon receipt of the registration reply (at step 216), the mobile node 104 is successfully registered with the second foreign agent 102; as a result, subsequent communication with the mobile node 104 is routed through the second foreign agent 102.

Thus, the present invention reduces latency in handoffs by allowing the mobile node 104 to recognize the reception of subsequent (extra) proxy router advertisements 114 from the first foreign agent 100 as an indication that the first foreign agent 100 has not yet received the registration request from the mobile node 104 (possibly due to the registration request being lost due to the communication link rapidly deteriorating, high error rate, or the like). Once attached to the second foreign agent 102, the mobile node 104 can also recognize the reception of an unsolicited unicast foreign agent advertisement from the second foreign agent 102 as an indication that another registration request for registration with the second foreign agent 102 needs to be transmitted. Thus, the mobile node 104 is able to retransmit its registration request, when requested, for registration with the second foreign agent 102 as soon as possible.

Figure 3:
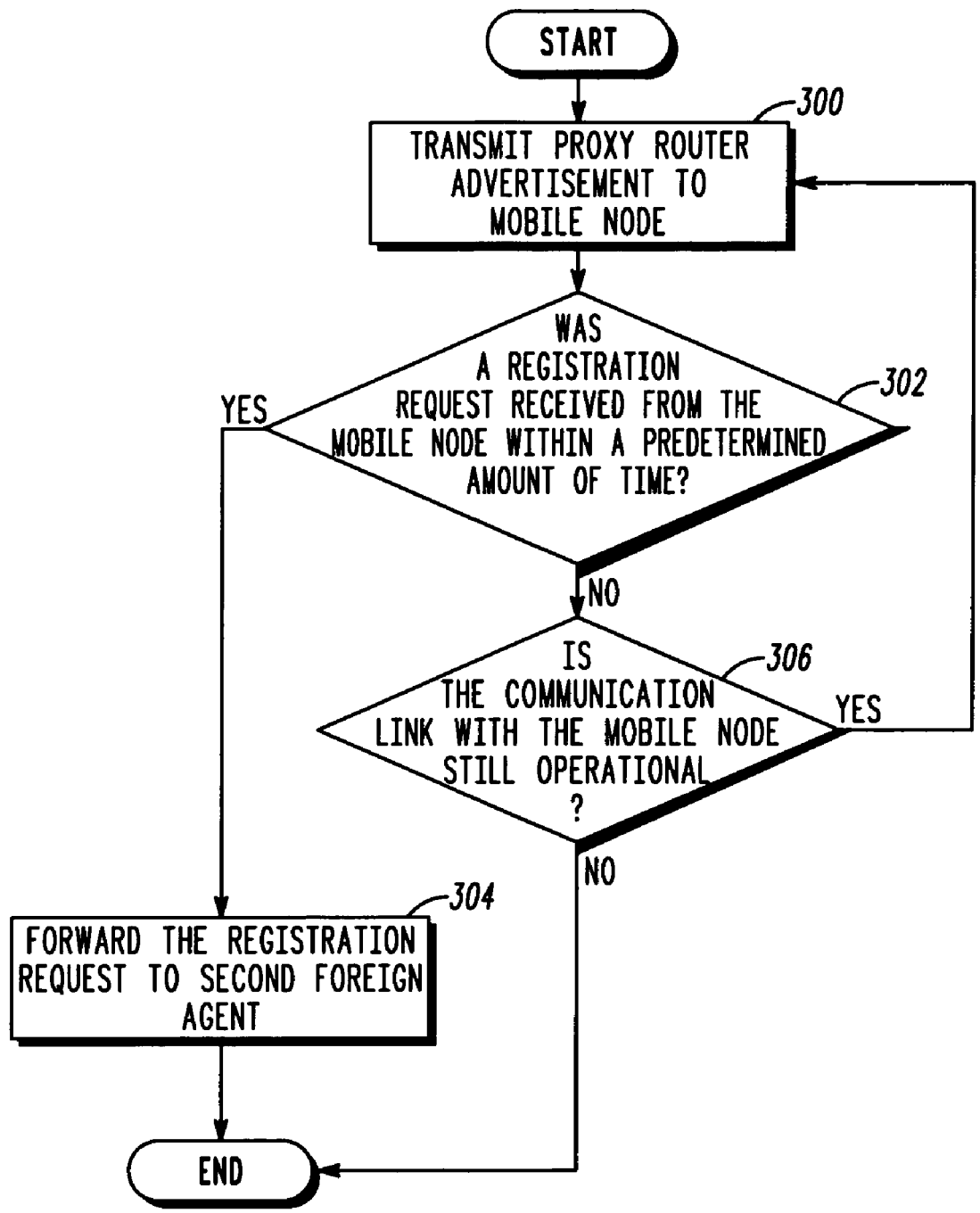
FIG. 3 illustrates a flowchart of the signaling transmitted and/or received by the first foreign agent in accordance with one embodiment of the present invention.

FIG. 3 illustrates a flowchart of the signaling transmitted and/or received by the first foreign agent 100 in accordance with one embodiment of the present invention. As noted above, the signaling illustrated in FIG. 3 is being performed in parallel with the signaling illustrated in FIG. 2. Starting with discovery that a handoff with the mobile node 104 is imminent, the first foreign agent 100 transmits a proxy router advertisement 112 to the mobile node 104 comprising at least the address of the second foreign agent 102 (at step 300). Upon transmission of the proxy router advertisement 112, the first foreign agent 100 waits to receive a registration request from the mobile node 104 for registration with the second foreign agent 102. If the registration request is received from the mobile node 104 (at step 302), the first foreign agent 100 forwards the request to the second foreign agent 102 (at step 304).

If the registration request, however, is not received from the mobile node 104 within a predefined period of time after transmitting the proxy router advertisement 112 (at step 302), the first foreign agent 100 determines whether the communication link with the mobile node 104 is still operational (at step 306). If the communication link is no longer operational, the first foreign agent 100 no longer attempts to communicate with the mobile node 104. If, however, the communication link is still operational with the mobile node 104, the first foreign agent 100 retransmits the proxy router advertisement 114 (at step 300). It should be noted that, in accordance with the present invention, the first foreign agent 100 will continue to retransmit its proxy router advertisement 114 to the mobile node 104 until a registration request for registration with the second foreign agent 102 is received from the mobile node 104, or until the communication link with the mobile node 104 is no longer operational, whichever is sooner.

Thus, the present invention reduces latency in handoffs by setting a timer in the first foreign agent 100. If the first foreign agent 100 does not receive the registration request for registration with the second foreign agent 102 from the mobile node 104 prior to expiration of the timer, the first foreign agent 100 transmits a subsequent proxy router advertisement 114 to the mobile node 104 to facilitate the pre-registration prior to handoff. Thus, the first foreign agent 100 informs the mobile node 104 that it has not received its registration request during the time frame in which it was expected.

Figure 4:
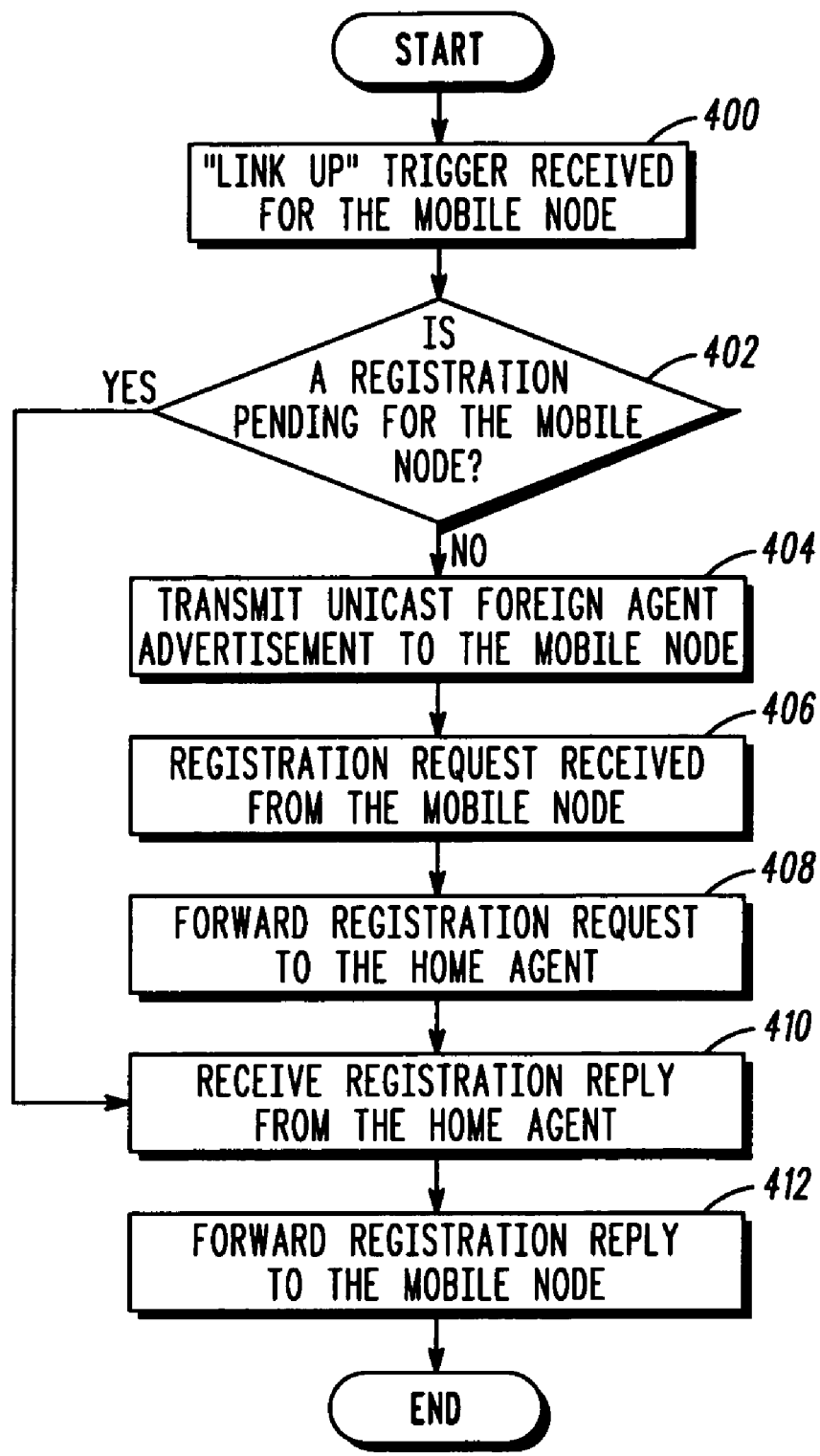
FIG. 4 illustrates a flowchart of the signaling transmitted and/or received by the second foreign agent in accordance with one embodiment of the present invention.

FIG. 4 illustrates a flowchart of the signaling transmitted and/or received by the second foreign agent 102. Again, as stated above, the signaling illustrated in FIG. 4 is performed in parallel with the signaling illustrated in FIG. 2. Starting with the mobile node 104 attaching to the second foreign agent 102, the second foreign agent 102 receives a "link up" trigger identifying attachment of a new mobile node 104 (at step 400). Upon receipt of the "link up" trigger, the second foreign agent 102 determines whether a registration is pending for the mobile node 104 (at step 402). If registration is currently pending for the mobile node 104, the second foreign agent 102 waits to receive a registration reply from the home agent 106 (at step 410). The second foreign agent 102 will eventually receive a registration reply from the home agent 106 indicating that the mobile node's registration with the second foreign agent 102 is successful, in which the second foreign agent 102 forwards the registration reply to the mobile node 104 (at step 412).

If registration, however, is not currently pending for the mobile node 104 (i.e., the second foreign agent 102 never received the forwarded registration request for the mobile node 104), the second foreign agent 102 transmits an unsolicited unicast foreign agent advertisement to the mobile node 104 (at step 404). In response to transmitting the foreign agent advertisement, the second foreign agent 102 waits to receive the registration request for registration with the second foreign agent 102 from the mobile node 104. Upon receipt of the registration request (at step 406), the second foreign agent 102 forwards the registration request to the home agent 106 (at step 408). The second foreign agent 102 will eventually receive a registration reply from the home agent 106 indicating that the mobile node's registration with the second foreign agent 102 is successful (at step 410), in which the second foreign agent 102 forwards the registration reply to the mobile node 104 (at step 412).

It should be noted that if by chance the second foreign agent 102 receives the registration reply for the mobile node 104 from the home agent 106 prior to the mobile node 104 "linking up" with the second foreign agent 102, the second foreign agent 102 buffers the registration reply until "link up" by the mobile node 104. The second foreign agent 102 buffering the registration reply does not slow down the handoff because layer 2 handoff needs to be completed before any information can be transmitted to and/or received from the mobile node 104 via the second foreign agent 102. Rather, buffering the registration reply until the mobile node 104 "links up" with the second foreign agent 102 increases the likelihood that the reply will not get lost due to a communication link deterioration, high error rates, or the like.

Figure 5:
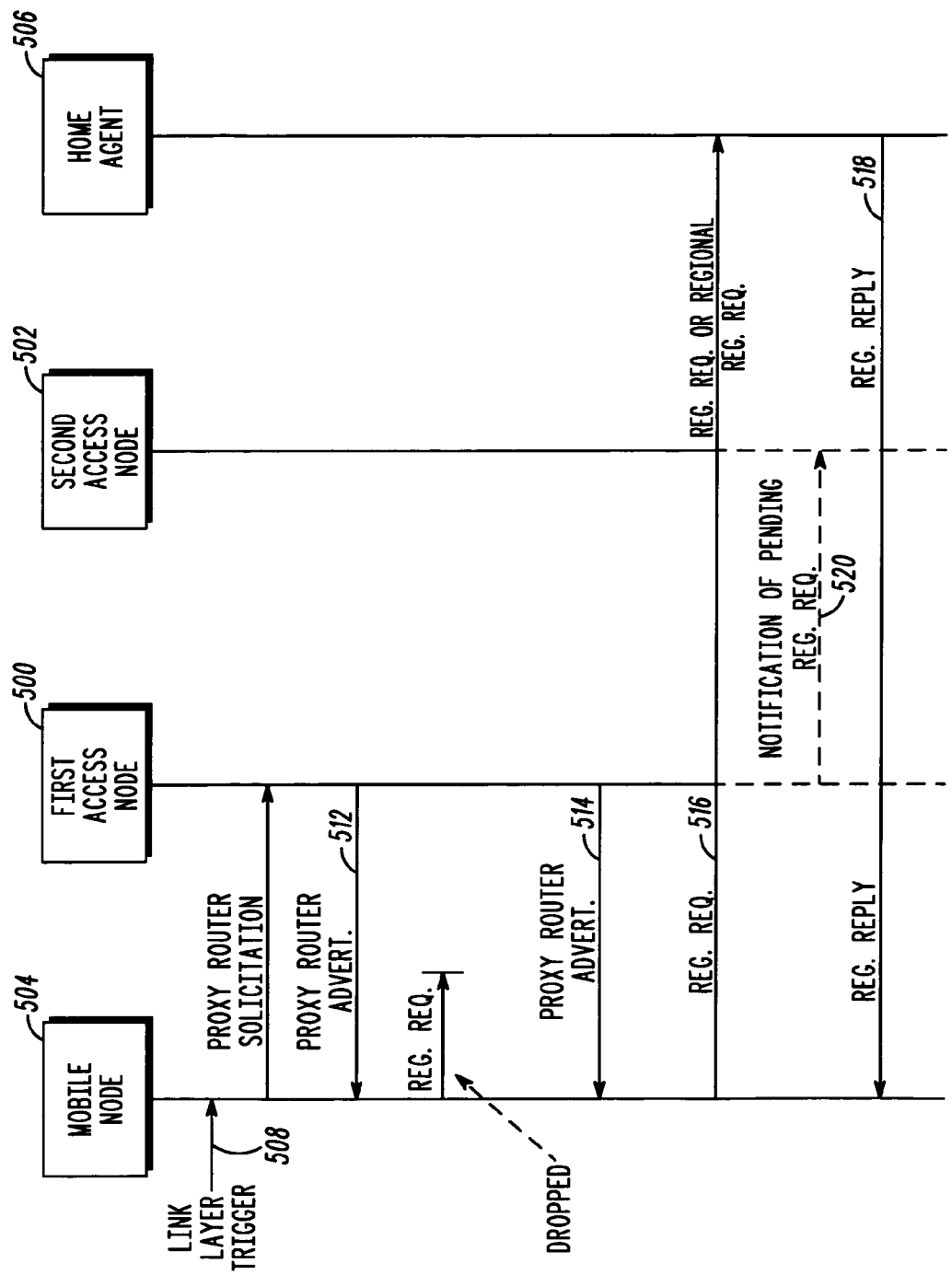
FIG. 5 illustrates a bounce diagram of the signaling between a mobile node, a first access node, a second access node, and a home agent.

In another embodiment, FIG. 5 illustrates the case where the mobile node, e.g. mobile node 504, uses co-located care-of addresses when communicating with access nodes, e.g. 500, 502. As is known to one of ordinary skill in the art, the term access nodes encompasses the foreign agents mentioned with respect to FIGS. 1-4. However, as used herein, the term access nodes specifically refers to entities at the edge (as opposed to the core) of a network that the mobile node has a point of presence relationship with. One example of an access node is an edge router that provides IP layer connectivity for the mobile node. Another example, is a wireless local area network (WLAN) access point, where the WLAN access point provides wireless connectivity to the infrastructure for the mobile node. As is known to one of ordinary skill in the art, a co-located care-of address (CCoA) is a temporary IP address assigned to the mobile node when the mobile node is not in its home network, e.g. served by home agent 506.

Referring to FIG. 5, the mobile node 504 acquires a CCoA when the mobile node is attached to a first access node 500 where the CCoA has a prefix belonging to the first access node 500, e.g. a router. As shown in FIG. 5, upon receiving a link layer trigger 508 (e.g. indicating that a handoff is pending), the mobile node 504 sends a proxy router solicitation to the first access node 500. The first access node 500 sends a proxy router advertisement 512 in response to the proxy router solicitation, just as described with respect to FIGS. 1-4. Since the mobile node 504 is moving to a new point of attachment, the mobile node 504 needs to acquire a new CCoA belonging to the prefix of the new point of attachment, namely a second access node 502. In one embodiment, the mobile node 504 may be able to autoconfigure a new CCoA based on information contained in the proxy router advertisement 512. Alternatively, the mobile node 504 may use other methods such as Dynamic Host Control Protocol (DHCP) to acquire a new CCoA for use with the second access node 502 where in such a case, the proxy router advertisement 512 may comprise the new CCoA acquired on behalf of the mobile node 504. In any case, there a number of ways that the mobile node 504 may acquire the new CCoA and such ways are known to one of ordinary skill in the art.

Continuing with FIG. 5, the mobile node 504 then sends a registration request to pre-register (also termed a pre-registration) its new CCoA via the first access node 500. If the registration request is dropped, the first access node 500 will retransmit the proxy router advertisement 514 to the mobile node 504. The mobile node 504 will then retransmit the registration request 516 via the first access node 500 (additionally the second access node 502, if necessary) to the home agent 506, e.g. as a registration request or a regional registration request. The home agent 506 sends a registration reply in response to the registration request 516. This registration reply is sent to the mobile node's new CCoA. As such, in one embodiment, the registration reply may be intercepted by the second access node 502 and forwarded to the mobile node 504. However, the mobile node 504 may move prior to receiving the registration reply. In such a case, the second access node 502 may buffer the registration reply and upon attachment of the mobile node 504, the second access node 502 will send the registration reply to the mobile node 504.

As is known to one of ordinary skill in the art, in the case of FIG. 5, the registration request and registration reply messages are addressed to the destination (e.g. the home agent) and not to the intermediary access nodes, while in the case of foreign agents, the registration request sent by the mobile node and the registration reply sent by the home agent are addressed to the intermediary foreign agents. For example, the registration request 516 is addressed to the home agent 506, whereas in the case of FIG. 1, the registration request 116 is addressed to the first foreign agent 100. Further, for example, the registration reply 518 is addressed to the mobile node's new CCoA as identified in the registration request 516. As such, the term "via" (as used herein) means that a message is passed through the intermediary access nodes with the intermediary access node's knowledge, but the message is not necessarily addressed to the intermediary access node. For example, the registration request 516 is transmitted via the first access node 500 and via means that the first access node 500 is aware of the registration request 516 but the registration request is addressed to the mobile node's new CCoA.

In alternative embodiments, the mobile node, e.g. mobile node 104 or 504, exchanges the proxy router solicitation and proxy router advertisement messages with the first access node 500 (and/or the first foreign agent 100) well in advance of an impending handoff. Exchanging these messages before an impending handoff removes this step from the critical handoff path. In such an embodiment, reception of a proxy router solicitation no longer implies an impending handoff. Hence, the first access node 500 (and/or the first foreign agent 100) cannot expect to receive a registration request from the mobile node shortly after sending the proxy router advertisement, e.g. 112 or 512. In such an embodiment, the registration request may be sent in a confirmed delivery manner to the first access node 500 (and/or the first foreign agent 100). For example, where there is link layer reliability, the layer 2 acknowledgement may indicate successful transmission of the registration request on the link. The first access node 500 (and/or the first foreign agent 100) may not be directly attached to the mobile node on that link because there may be a base station or an access point to which the mobile node is attached. The first access node 500 (and/or the first foreign agent 100) may be on the wired link to which the base station or the access point is connected on the infrastructure side. Since the wireless link is the one most prone to errors and dropped packets, in one embodiment, the link layer acknowledgement may be sufficient to indicate delivery of the registration request.

In alternate embodiments, where the link layer may not have reliable delivery mechanisms, where additional wireless backhaul links are present, where the link between the base station or access point and the first access node 500 (and/or the first foreign agent 100) cannot be considered reliable, then other means of confirmed delivery mechanisms may be required. In such cases, the registration request may indicate that the mobile node needs an acknowledgement from the first access node 500 (and/or the first foreign agent 100). When this indication is present, the first access node 500 (and/or the first foreign agent 100) will send an acknowledgement back to the mobile node upon receiving the registration request. As is known to one of ordinary skill in the art, although a few methods of confirmed delivery are discussed herein, a number of other means of confirmed delivery can be used for sending the registration request.

In any case, when the mobile node 504 does not receive an acknowledgement of delivery of the registration request, the mobile node 504 will retransmit the registration request via the first access node 500, if the mobile node 504 is still attached to the first access node 500. If the mobile node 504 moves to the second access node 502 before the mobile node 504 can retransmit the registration request, the mobile node 504 will retransmit the registration request immediately upon attachment to the second access node 502.

Figure 6:
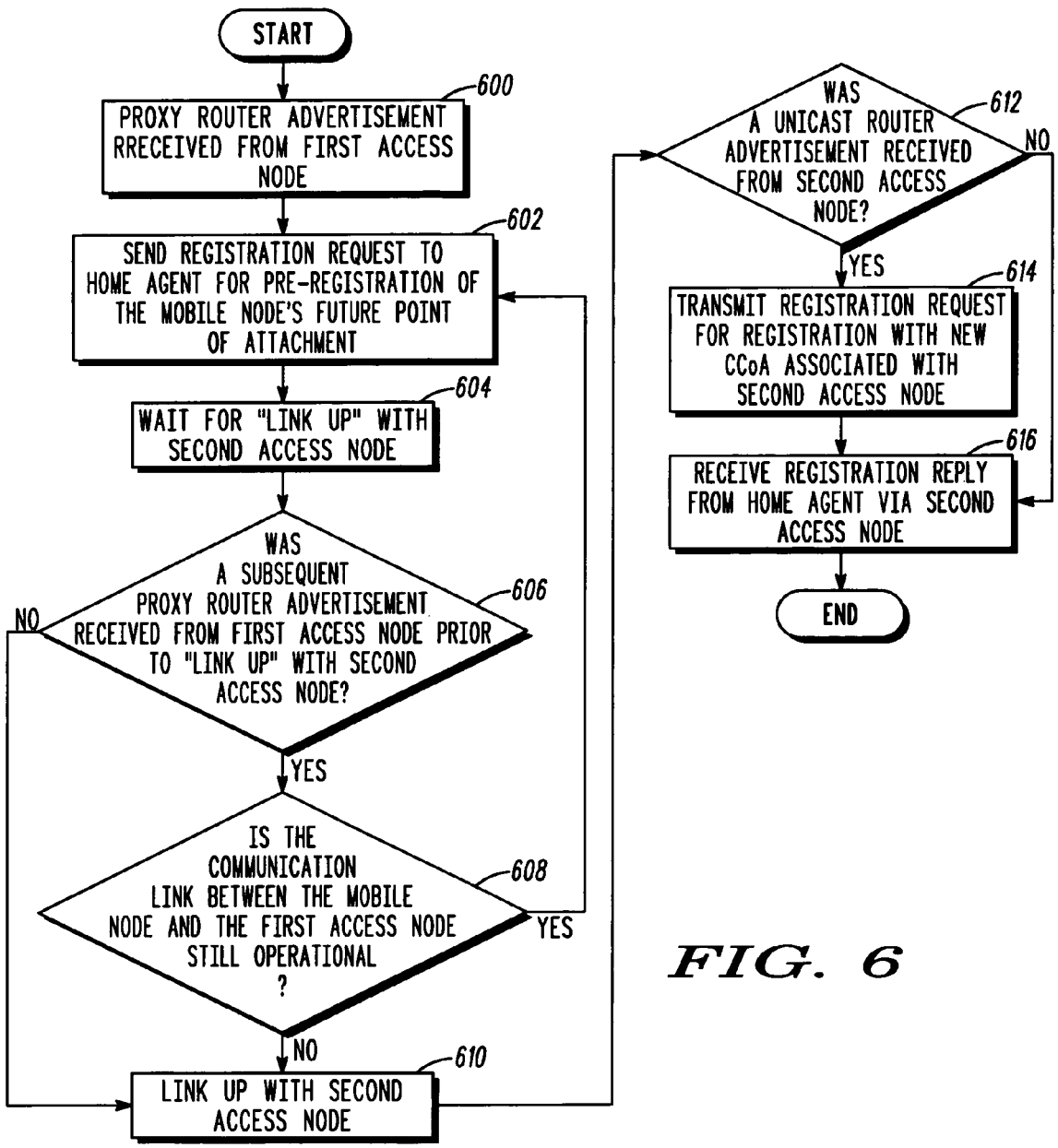
FIG. 6 illustrates a flowchart of the signaling transmitted and/or received by the mobile node in accordance with one embodiment of the present invention.

FIG. 6 illustrates a flowchart of the signaling transmitted and/or received by the mobile node 504 in accordance with one embodiment of the present invention. Upon receipt of the proxy router advertisement from the first access node 500 (at step 600), the mobile node 504 transmits a registration request to the home agent 506 for pre-registration of the mobile node's future point of attachment, e.g. in this case, the second access node 502 via the first access node 500 (at step 602) and waits for "link up" with the second access node 502 (at step 604).

If the mobile node 504 receives a subsequent proxy router advertisement 514 from the first access node 500 prior to "link up" with the second access node 502 (at step 606), it is assumed that the first access node 500 did not receive the registration request from the mobile node 504. As a result, the mobile node 504 determines the status of the communication link between the mobile node 504 and the first access node 500 (at step 608). If the mobile node 504 determines that the communication link with the first access node 500 has deteriorated (i.e., the communication link between the mobile node 404 and the first access node 500 is no longer operational), the mobile node 504 no longer attempts to communicate with the first access node 500, and waits for a "link up" with the second access node 502 (at step 610).

If the mobile node 504, however, determines that the communication link with the first access node 500 is still operational (at step 608), the mobile node 504 retransmits the registration request 516 to the home agent 506 for registration with the second access node 502 via the first access node 500 (at step 602) and continues to wait for "link up" with the second access node 502 (at step 604). It is important to note that, in accordance with the present invention, as long as the communication link between the mobile node 504 and the first access node 500 is operational, the mobile node 504 will retransmit its registration request 516 for pre-registration of the mobile's node's future point of attachment, e.g. in this case, the second access node 502, upon receipt of a proxy router advertisements 512, 514 from the first access node 500.

Upon "link up" at the second access node 502 (at step 610), the mobile node 504 waits idly until it receives a registration reply from the second access node 502 indicating a successful registration of the mobile node's new CCoA associated with the second access node 502. As used herein, associated with means that the CCoA has the same prefix as the subnet that the second access node is attached to. If the mobile node 504 receives a unicast router advertisement message (addressed directly to the mobile node 504) from the second access node 502 while waiting for the registration reply from the home agent via the second access node 502 (at step 612), the mobile node 504 transmits its registration request to the home agent 506 for registration with the new CCoA associated with the second access node 502 (at step 614), and continues to wait to receive the registration reply 518. In one embodiment of the present invention, the mobile node 504 should only receive the unicast router advertisement for registration with the new CCoA at the second access node 502, if the second access node 502 did not receive the registration request from the mobile node 504 (i.e., the first access node 500 did not successfully receive and/or forward the previous registration request for registration with the second access node 502 from the mobile node 504).

Upon receipt of the registration reply (at step 616), the mobile node 504 is successfully registered with the second access node 502; as a result, subsequent communication with the mobile node 504 is routed through the second access node 502.

Thus, the present invention reduces latency in handoffs by allowing the mobile node 504 to recognize the reception of subsequent (extra) proxy router advertisements 514 from the first access node 500 as an indication that the first access node 100 has not yet received the registration request from the mobile node 104 (possibly due to the registration request being lost due to the communication link rapidly deteriorating, high error rate, or the like). Once attached to the second access node 102, the mobile node 504 can also recognize the reception of an unsolicited unicast router advertisements from the second access node 502 as an indication that another registration request for registration of the new CCoA associated with the second access node 502 needs to be transmitted. Thus, the mobile node 504 is able to retransmit its registration request, when requested, for registration as soon as possible.

Figure 7:
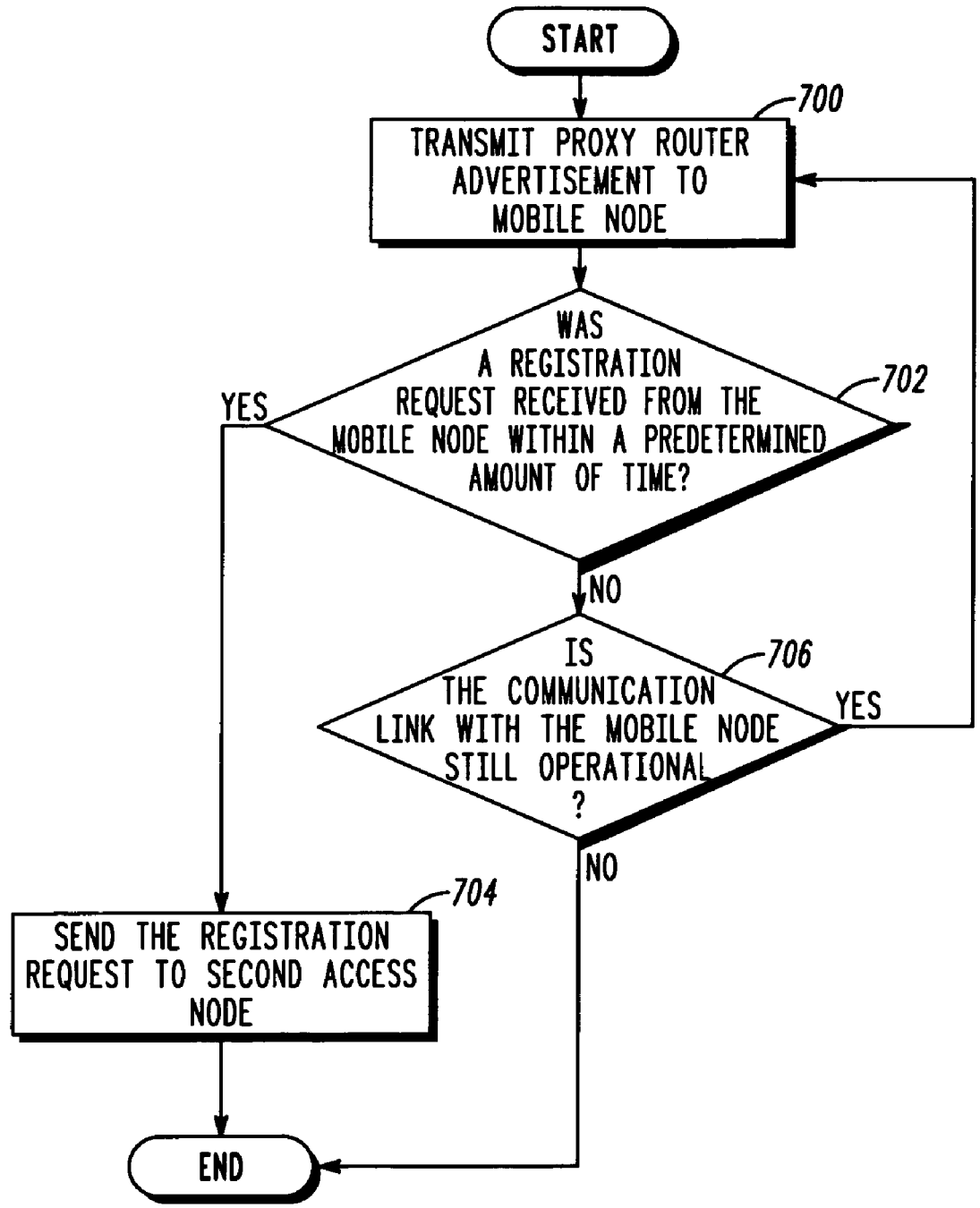
FIG. 7 illustrates a flowchart of the signaling transmitted and/or received by the first access node in accordance with one embodiment of the present invention.

FIG. 7 illustrates a flowchart of the signaling transmitted and/or received by the first access node 500 in accordance with one embodiment of the present invention. As noted above, the signaling illustrated in FIG. 7 is being performed in parallel with the signaling illustrated in FIG. 6. Starting with discovery that a handoff with the mobile node 504 is imminent, the first access node 500 transmits a proxy router advertisement 512 to the mobile node 504 comprising at least the address of the second access node 502 (at step 700). Upon transmission of the proxy router advertisement 512, the first access node 500 waits to receive a registration request from the mobile node 504 for registration with the second access node 502. If the registration request is received from the mobile node 504 (at step 702), the first access node 500 sends the registration request to the home agent (step 704) by either a) forwarding the request to the second access node 502 for delivery to the home agent 506 or b) optimally, forwarding the registration request to the home agent 506 directly and notifying the second access node that a registration request is pending (e.g. by message 520). However, forwarding the request to the second access node 502 for delivery to the home agent 506 (namely step a) may be required to avoid the registration request being dropped by a router in the network if the routers in the network apply ingress filtering.

If the registration request, however, is not received from the mobile node 504 within a predefined period of time after transmitting the proxy router advertisement 512 (at step 702), the first access node 500 determines whether the communication link with the mobile node 504 is still operational (at step 706). If the communication link is no longer operational, the first access node 500 no longer attempts to communicate with the mobile node 504. If, however, the communication link is still operational with the mobile node 504, the first access node 500 retransmits the proxy router advertisement 514 (at step 700). It should be noted that, in accordance with the present invention, the first access node 500 will continue to retransmit its proxy router advertisement 514 to the mobile node 504 until a registration request for pre-registration of the new CCoA associated with the second access node 502 is received from the mobile node 504, or until the communication link with the mobile node 504 is no longer operational, whichever is sooner.

Thus, the present invention reduces latency in handoffs by setting a timer in the first access node 500. If the first access node 500 does not receive the registration request for pre-registration of the CCoA associated with the second access node 502 from the mobile node 504 prior to expiration of the timer, the first access node 500 transmits a subsequent proxy router advertisement 514 to the mobile node 504 to facilitate the pre-registration prior to handoff. Thus, the first access node 500 informs the mobile node 504 that it has not received its registration request during the time frame in which it was expected.

Figure 8:
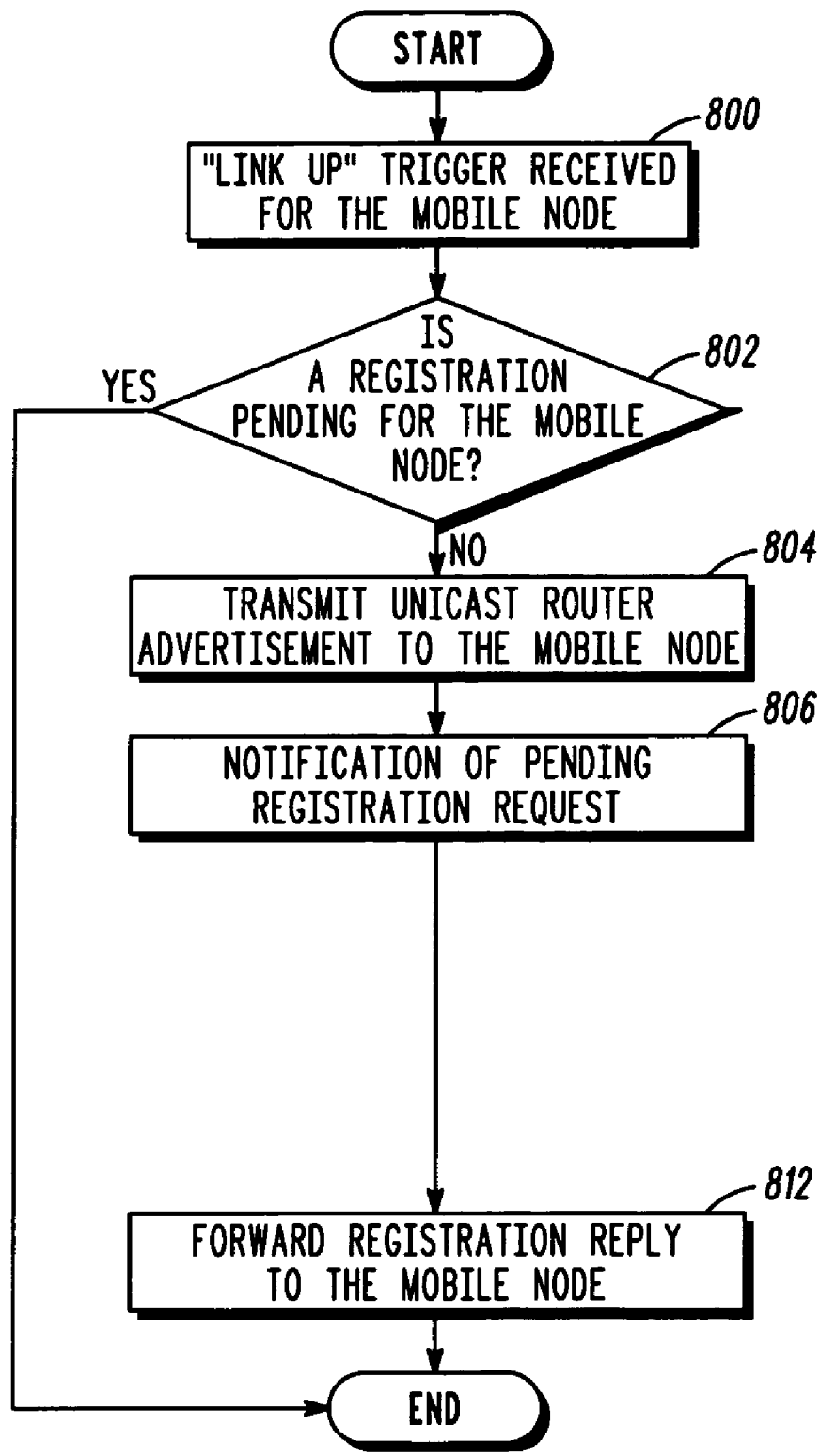
FIG. 8 illustrates a flowchart of the signaling transmitted and/or received by the second access node in accordance with one embodiment of the present invention.

FIG. 8 illustrates a flowchart of the signaling transmitted and/or received by the second access node 502. Again, as stated above, the signaling illustrated in FIG. 8 is performed in parallel with the signaling illustrated in FIG. 6. Starting with the mobile node 504 attaching to the second access node 502, the second access node 502 receives a "link up" trigger identifying attachment of a new mobile node 504 (at step 800). Upon receipt of the "link up" trigger, the second access node 502 determines whether a registration is pending for the mobile node 504 (at step 802) (e.g. by message 520). If registration is currently pending for the mobile node 504, the pending registration indicates that the pre-registration was successful. If registration is not currently pending for the mobile 504, then the second access node 502 transmits an unsolicited unicast router advertisement to the mobile node 504 (at step 804). In response to transmitting the unicast router advertisement, the second access node 502 waits to receive notification of a pending registration request as described with respect to FIG. 6, namely step 614 (step 806)). If the second access node 502 receives a registration reply 518 from the home agent 506 indicating that the mobile node's registration with the new CCoA associated with the second access node 502 is successful (step 810), the second access node 502 forwards the registration reply to the mobile node 504 (at step 812).

It should be noted that if by chance the second access node 502 receives the registration reply for the mobile node 504 from the home agent 506 prior to the mobile node 504 "linking up" with the second access node 502, the second access node 502 buffers the registration reply until "link up" by the mobile node 504. The second access node 502 buffering the registration reply does not slow down the handoff because layer 2 handoff needs to be completed before any information can be transmitted to and/or received from the mobile node 504 via the second access node 502. Rather, buffering the registration reply until the mobile node 504 "links up" with the second access node 502 increases the likelihood that the reply will not get lost due to a communication link deterioration, high error rates, or the like.

The present invention can be implemented in hardware, firmware and/or software. For example, a storage medium having stored thereon a set of instructions which, when loaded into a hardware device (e.g., a microprocessor), causes the hardware device/communication device to perform the functions of the present invention. Such a hardware device is located at the mobile node, the first foreign agent and/or the second foreign agent as one such means to implement the present invention.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for improving the reliability of a low latency handoff, the method comprising the steps of:
   receiving a first message from a first device;
   upon receipt of the first message, transmitting a registration request via the first device to a home agent for pre-registration of a co-located care-of address associated with a second device, wherein the registration request comprises the co-located care-of address associated with the second device; and
   if the first message is received again from the first device prior to attaching to the second device, re-transmitting the registration request via the first device.

2. The method of claim 1 wherein the first message is a proxy router advertisement message.

3. The method of claim 1 further comprising the steps of:
   attaching to the second device;
   receiving a second message from the second device; and
   upon receipt of the second message, transmitting the registration request via the second device.

4. The method of claim 3 wherein the second message is a unicast router advertisement.

5. The method of claim 1 further comprising receiving a link layer trigger indicating that a handoff is pending prior to the step of receiving.

6. The method of claim 1 wherein the steps of receiving, transmitting and re-transmitting are stored on a storage medium, which when loaded into a hardware device, causes the hardware device to perform the steps of receiving, transmitting and re-transmitting.

7. The method of claim 1 wherein the first device and the second device is one of a first access node and a second access node.

8. A method for improving the reliability of a low latency handoff, the method comprising the steps of:
   transmitting a registration request to a first device, wherein the registration request is for pre-registration of a co-located care-of address associated with a second device and wherein the registration request requires confirmed delivery;
   if the registration request for pre-registration was not received by the first device within a predetermined time period after the step of transmitting, re-transmitting the registration request via the second device after attaching to the second device.

9. The method of claim 8 wherein confirmed delivery requires that the registration request comprise a request for acknowledgement of the delivery of the registration request.

10. The method of claim 8 wherein the first device is a first access node and wherein the second device is a second access node.

11. The method of claim 8 wherein the steps of receiving, transmitting and re-transmitting are stored on a storage medium, which when loaded into a hardware device, causes the hardware device to perform the steps of receiving, transmitting and re-transmitting.

12. A method for improving the reliability of a low latency handoff, the method comprising the steps of:
   receiving a proxy router advertisement from a first access node;
   upon receipt of the proxy router advertisement, transmitting a registration request via the first access node to a home agent for pre-registration of a co-located care-of address with a second access node, wherein the registration request comprises the co-located care-of address associated with the second access node; and if the proxy router advertisement is received again from the first access node prior to attaching to the second access node, re-transmitting the registration request via the first access node.

13. The method of claim 12 further comprising the steps of:
attaching to the second access node;
receiving a unicast router advertisement from the second access node; and
upon receipt of the unicast router advertisement, transmitting the registration request via the second device.

14. The method of claim 12 further comprising receiving a link layer trigger indicating that a handoff is pending prior to the step of receiving.

15. The method of claim 12 wherein the second access node buffers a registration reply sent by a home agent in response to the registration request.

16. The method of claim 15 further comprising receiving the buffered registration reply upon attaching to the second access node.

17. The method of claim 12 wherein the steps of receiving, transmitting, and re-transmitting are performed by a mobile node.

* * * * *